Jan. 21, 1964  T. C. BIRD  3,118,802
MACHINE FOR FORMING A PANEL CONSISTING OF A COMPRESSED
MULTIPLE PIECE CORE HAVING FLEXIBLE SHEET FACINGS
Filed June 11, 1959  4 Sheets-Sheet 1

INVENTOR.
Thomas C. Bird
BY
ATTORNEY

Jan. 21, 1964 T. C. BIRD 3,118,802
MACHINE FOR FORMING A PANEL CONSISTING OF A COMPRESSED
MULTIPLE PIECE CORE HAVING FLEXIBLE SHEET FACINGS
Filed June 11, 1959 4 Sheets-Sheet 2

INVENTOR.
Thomas C. Bird
BY
ATTORNEY.

Fig. 6

INVENTOR.
Thomas C. Bird
BY
ATTORNEY.

United States Patent Office 3,118,802
Patented Jan. 21, 1964

1

3,118,802
MACHINE FOR FORMING A PANEL CONSISTING OF A COMPRESSED MULTIPLE PIECE CORE HAVING FLEXIBLE SHEET FACINGS
Thomas C. Bird, Missoula, Mont.
(1335 Mariemont Ave., Sacramento 25, Calif.)
Filed June 11, 1959, Ser. No. 819,715
9 Claims. (Cl. 156—358)

This invention relates to apparatus for manufacturing panels, and more particularly to improved apparatus for making a laminated type of panel which has disposed over at least one and usually both faces a flexible sheet of facing material, this facing material covering a core or backing of the sort which gives stiffness to the panel.

A product which finds many uses and is relatively inexpensive to make is a laminated panel consisting of a core of wood slats placed in edge-abutting relation, and over faces of this core a kraft paper layer which is glued onto the core. In such a product the abutting edges of the wood slats are not glued together, since leaving the slats disjointed renders the completed panel greater resistance to warping. Thus the slats are held together by the adhesive deposit at the interface between the paper layer and the faces of the slats.

A general object of this invention is to provide apparatus for producing a panel of the type described which is fast in operation and produces panels of consistently high quality.

In the manufacture of such panels, a number of problems have been encountered. Since the wood slats making up the core are disjointed, provision must be made for laying up the wood slats prior to bonding on the paper facing. While this in itself is not difficult, the fact that the slats are loose from each other has made difficult the step of bonding on the paper facing. The best panel results when the slats are tightly compressed edge to edge, and the paper is bonded while the slats are in this state to produce a panel having a degree of internal stressing. This invention contemplates a construction wherein such compression of the wood slats is produced by introducing a row of such slats between the platens of an interruptible press and supplying end pressure to the row prior to bringing the platens together in a press cycle. The paper facing and adhesive, after being bonded to opposite faces of the row, holds the slats together, and the result is a superior product having a core of tightly packed slats.

In an interruptible press of the type that is used to produce relatively high press pressures, the work in the press is held stationary during the press cycle. This introduces difficulties in handling the adhesive used in bonding on the facing. Adhesive, when spread in a film, starts to dry up quite quickly, and thus must be spread in film form directly before use. Prior techniques generally have relied upon applying glue to the board faces, and only to those faces that could be handled immediately in the next press cycle, to avoid glue waste or premature drying of the glue. This technique is slow, however, and difficult to handle, particularly if the paper facing is to be applied before entry of the slats into the press. The present invention relies on applying the glue to the paper facing, and handling the facing and boards in such a way that drying is not a problem.

An important feature of the invention is the provision of means for rotating each of the applier rolls, so that their resistance to rotation need not be overcome by the paper facing and they will assist in pulling off the facing from a roll and feeding the facing into the apparatus at the speed desired. This rotation of the applier rolls then is correlated with the speed that material is fed into the press. The rolls are rotated continuously to prevent drying of adhesive on the surfaces of the rolls. Provision is made for moving the paper facing off of the applier rolls during the interval of the press cycle when feeding is interrupted temporarily, to prevent buildup of excess glue on the rolls.

The apparatus of this invention includes, on the off-bearing side of the interruptible press, a releasable abutment means which is movable above and below the support plane defined by the off-bearing or transport conveyer located on the same side of the press. When this abutment means is raised above the support plane of the conveyer, it serves to stop the forward progress of a row of slats advanced between the platens of the press, so that the conveyer section on the other side of the press, which previously had been feeding the slats into position, then starts to function as a means for producing longitudinal compression in the row of slats. This abutment remains raised until a press cycle starts, and until full pressures are reached in the press. At this time the abutment means is lowered to release compression in the slats on the off-bearing side. A saw mechanism is then actuated to cut off selected widths of completed panel. The cut panel pieces are moved off the off-bearing conveyer, to free this conveyer for the reception of paneling next to be moved out of the press. When the press cycle subsequently ends and the press platens are separated, actuation of the conveyer section on the in-feed side of press moves additional slats into position, and the cycle of operation repeats.

The invention includes control means for coordinating the operation of the various mechanisms involved. Thus, after the press cycle starts, the control mechanism serves automatically (1) to lower the abutment means; (2) to cause cutting of completed paneling; (3) to remove the facing from contact with the applier rolls; and (4) to stop movement of the conveyer section on the in-feed side of the press. Then, after cutting of the panel, the control mechanism functions to reinstate the abutment means to its original position. On completion of the press cycle, the driven conveyer section on the in-feed side is started. Of particular importance is the fact that the operation of all the components of the apparatus is tied into the timing of the press cycle, the latter being of predetermined and fixed duration.

Another feature of the invention is the provision of a novel mounting for the driven conveyer section on the in-feed side of the press. The mounting enables the conveyer mechanism to be backed off from the press, in case of a tear in the paper facing or in the event that other repairs or adjustments are needed. This greatly facilitates running of the apparatus at the manufacturing site.

Other objects, features and advantages of the invention will become apparent as the following description is read in conjunction with the accompanying drawings, wherein.

Figures 1, 4, 5:
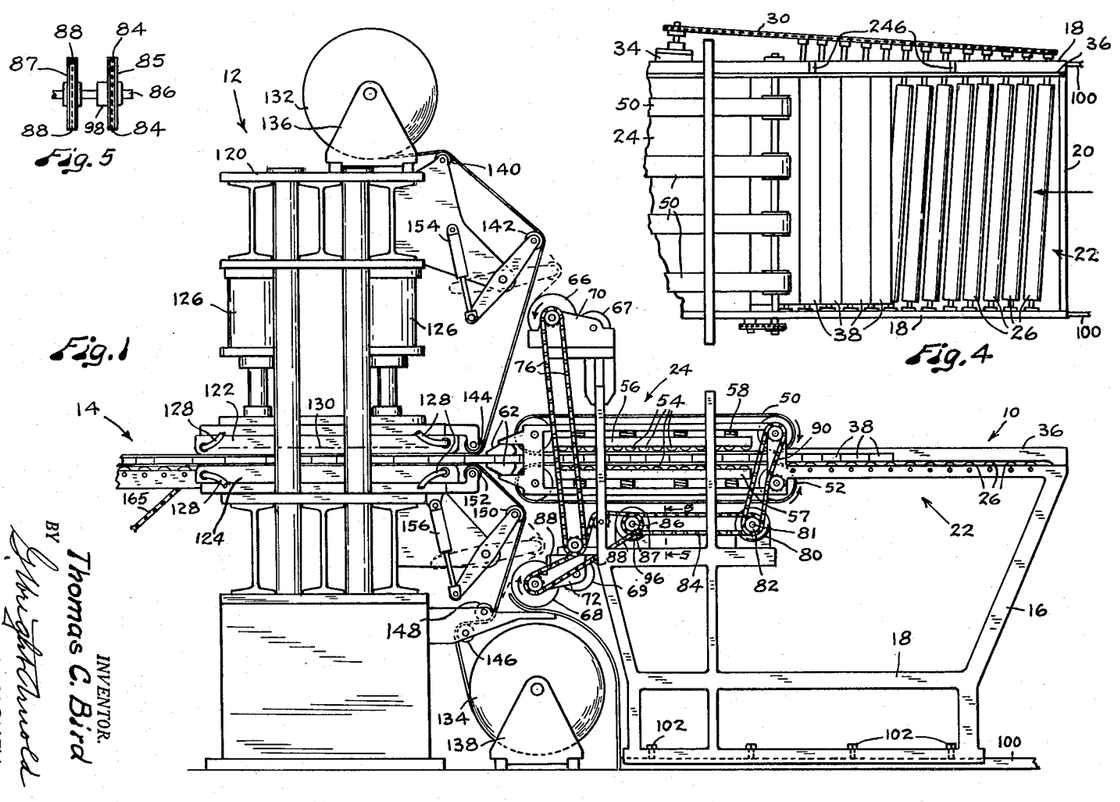
FIGURE 1 is a side elevation of the in-feed side of the apparatus, showing the in-feed conveyer section and press means of the apparatus.
FIG. 4 is a top view of portions of the apparatus at the infeed end of the apparatus.
FIG. 5 is a view along the line 5—5 in FIG. 1, slightly enlarged.
Figures 2, 3:
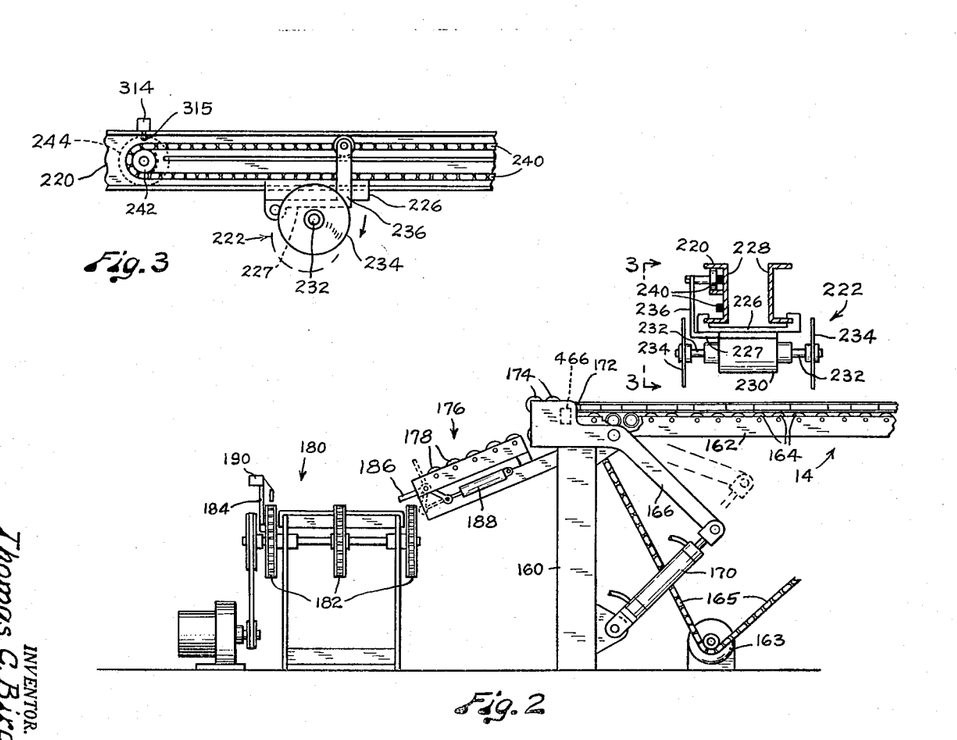
FIG. 2 is a side elevation of the off-bearing conveyer means, and also showing the saw mechanism which is used to cut the formed panel into pieces, FIG. 2 being an extension of FIG. 1.
FIG. 3 is a view of the apparatus along the line 3—3 in FIG. 2.

Referring now to the drawings wherein a specific embodiment of the invention is illustrated, and more particularly to FIGS. 1, 2 and 4, the apparatus comprises in general an infeed section indicated at 10, a press section indicated at 12 and an outfeed or off-bearing section 14, these sections defining an elongated treating bed. The flow of material through the apparatus is from the infeed section 10 through the press section 12 and thence to the off-bearing section 14, where the formed paneling is cut into pieces and then cleared from the apparatus.

Considering now specifically each of the various sections, the infeed section 10 comprises frame structure 16 having a pair of opposed side standards 18 spaced apart and made rigid and held in a vertical position as by cross-frame members 20. The frame 16 mounts at the right end as seen in FIG. 1, or at the infeed end, an open lay-up table portion 22 with top exposed and at the left end of the frame there is a power-driven infeed conveyer section indicated at 24.

Lay-up table portion 22 comprises plural elongated rolls 26 journaled at their ends in opposed standards 18. These rolls, as can be seen with reference to FIG. 4, are set at an oblique angle relative to the line of travel of material, which is in the direction of the arrow shown in FIG. 4. The rolls have affixed to one set of ends suitable sprockets which engage a chain 30. Chain 30 is driven by a motor 34 which runs constantly during operation of the apparatus. Thus, rolls 26 are power-driven, and in operation they are rotated in counterclockwise direction in FIG. 1, so as to cause material to move from right to left. A fence 36 extends along one side of the lay-up table portion, as seen in FIG. 4. This fence aligns the ends of disjointed board slats, indicated at 38, which are placed on the lay-up table portion eventually to become the core of finished panels. The oblique setting of the rolls tends to urge the slats 38 toward the fence so that their ends move into contact with the fence. The rolls move the slats 38 into loose edge contact prior to the slats entering conveyer section 24. Since the top of the table portion is exposed and unencumbered, boards can be arranged on the table constantly during operation of the apparatus.

The power-driven conveyer section 24 which is located forwardly of lay-up table portion 22 comprises sets of opposed clamping belts, each set having an upper and a lower belt indicated at 50 and 52, respectively. Adjacent runs of the belts in each set cooperate in gripping onto the opposed faces of board slats 38. The belts are trained at their ends over suitable pulleys. The belts, in frictionally engaging top and bottom faces of the slats, are operable to exert a positive forward thrust on a row of slats and produce compression longitudinally in such row, if forward progress of the row of slats is stopped at the other end of the row. The frictional grab of the belts is enhanced by using belts with outer surfaces of enlarged width, as in this way each belt contacts a greater area of the slat faces.

The oppositely disposed runs of each set of belts 50 and 52 run over pulleys 54 disposed along the belt runs, these pulleys being mounted on upper and lower mounting frames 56, 57. Compression springs 58 interposed between the mounting frames and frame 16 yieldably urge opposed sets of pulleys together.

Slats 38, on leaving the sets of belts 50, 52, are prevented from buckling up and thus becoming disarranged by guides 62 also secured to the frame 16 at the forward end thereof. The belts themselves prevent buckling of the slats while they are in the conveyer section. When a row of disjointed slats is compressed longitudinally of the row, a buckling tendency is produced which, if not taken care of, would be troublesome. No buckling occurs at the lay-up table portion, since smooth-surfaces rolls 26 (usually made of steel) produce no significant edge-to-edge compression in the slats.

There is also included in infeed section 10 an applier roll mechanism for applying adhesive to the inner faces of opposed sheets of paper facing. Specifically, mounted above and below the path of material are upper and lower adhesive applier rolls 66, 68, respectively. These are elongated and cylindrical in form, and extend across the apparatus with their peripheries engaging the faces of paper drawn thereover, thus to produce films of adhesive. The rolls are rotatably mounted, upper roll in a frame portion 70 and lower roll in a frame portion 72. With each of the applier rolls, there is provided a doctor roll, these being indicated at 67, 69. Adhesive adheres to the rolls when the rolls are rotated through a mass of the liquid adhesive. The upper roll rotates through a container of such adhesive, holding the adhesive near the base of the roll. With the lower roll, shields are provided at the ends of the roll to enable a mass of adhesive to be contained above the bite or nib of the roll and doctor roll 69.

Preferably the applier rolls are power-rotated, with rotation occurring in the directions which coincide with the movement of the paper passing thereover. The applier rolls have relatively heavy mass and are drawn through adhesive. Thus, it is best not to rely on rotation of the rolls being produced through engagement with the moving paper facing only. Further, the rolls have been found to have a pulling action on the paper facing, helping to feed the facing when they are power-rotated, which is beneficial. Referring again to FIG. 1, the applier roll at the top of the apparatus (roll 66) is driven by a chain 76, and the lower applier roll 68 is driven by a chain 88. A motor 80, motor shaft 81, sprocket 82 connected to motor shaft 81 of the motor, and chain 84 provide the drive for chains 86, 88. The drive is by chain 84 rotating a sprocket 85 and a shaft 86, this shaft carrying a sprocket 87 that engages chain 88 (see FIG. 5).

Motor 80 also drives the belt sets of the driven conveyer section 24. The drive to the belts is through chain 90 which passes over sprockets secured to the pulley shafts at the feed end of conveyer section 24. The size of the various sprockets used is selected so that the slats move forwardly through the driven conveyer section at substantially the same speed as the speed of rotation of the peripheries of the applier rolls 66, 68.

Motor 80 is a rotary type, hydraulic motor and is operated only intermittently, the motor stopping during a press cycle of the press in press section 12. This is so because it is desirable to stop movement of the belt sets when the press is operating. The applier rolls are driven constantly, however, in order to prevent small adhesive from solidifying on the roll peripheries. Thus, a constantly running motor 96 is provided which is operable to rotate shaft 86 and chain 88 at a slightly slower speed than the speed of rotation produced by chain 84. Sprocket 85 is connected to shaft 86 by way of a one-way clutch mechanism 98 (see FIG. 5) that enables shaft 86 to rotate freely in a driving direction (clockwise in FIG. 1) relative to sprocket 85. Clutch mechanism 98, however, connects for simultaneous rotation sprocket 85 and shaft 86 when the sprocket is urged in a driving direction relative to the shaft by chain 84. In this way, when motor 80 is started to produce movement of the belt sets and applier rolls, sprocket 85 and shaft 86 move as a unit, and when motor 80 is stopped, shaft 86 is turned by motor 96 with sprocket 85 remaining stationary on the shaft.

Frame 16 of infeed section 10 is mounted on a pair of ways 100 secured to the floor. The frame is locked in place on the ways by means of fasteners, which may take the form of screws indicated at 102. When these fasteners are loosened, frame 16 may be moved to the right on ways 100 to move the applier rolls, power-driven conveyer section 24 and lay-up table portion away from the press section 12. In this way ready access to the infeed end of the press section is provided, which is desirable in case of tears in the paper facing and when other types of repairs are needed.

Considering now press section 12, this comprises a frame 120 mounting a pair of opposed pressure platens indicated at 122, 124 of an interruptible press. Platen 124 is mounted in fixed position on the frame slightly below the path of travel of material through the apparatus. Platen 122, which is above platen 124, is moved down and then up during a press cycle by hydraulic piston cylinder 126. The platens are operable when brought together during a press cycle to produce compression of a row of wood slats normally to the plane of their faces. The platens of the press section are heated, as by steam, which is introduced to the platens by conduits 128. Thus, during the press cycle the adhesive bonding the paper facing is subjected to heat as well as pressure.

The infeed end of the press section is directly adjacent guides 62. This enables the wood slats to move smoothly into the space between the press platens when they are separated and in a release position. The dotted line 130 indicates the raised position of the upper press plates, when the press platens are separated and just before the start of a press cycle. It will be noted that in the raised position the press platens only slightly clear material passed therein between. Thus, the platens act as guide means for the slats passed therein between, preventing the slats from buckling up and becoming disarranged.

An elongated web of paper facing, such as contained in rolls 132, 134, is continuously applied to opposite faces of the slats. Roll 132 is mounted on top of the press section as by mounting 136. Roll 134 is mounted on mounting 138 near the base of the apparatus. Paper facing leaves roll 132 and thence passes over a guide roll 140, a jump roll 142 and another guide roll 144 directly at the infeed end of paten 122, the latter roll constituting a guide means directing the facing against the upper surface of the row of slats. In a somewhat similar manner, paper facing leaves roll 134, thence passes over a pair of guide rolls 146, 148, a jump roll 150 and another guide roll 152 before entering between the press platens. Note that the guide rolls 144, 152 feed the facing onto the row of the slats at points between the driven conveyer section and the infeed end of the press platens. Because of this the paper facing is free from any tearing action, such as might occur if it were passed between the belts of the driven conveyer section.

Jump rolls 142, 150 are included to enable movement of the paper facing away from the adhesive applier rolls when the press platens are brought together in a press cycle, and forward movement of the material is stopped. It should be remembered that the applier rolls are rotated constantly, and if the paper were always to remain in engagement with the applier rolls, excessive amounts of adhesive would build up on the paper. The jump rolls prevent this from happening. The jump rolls are actuated by air-operated piston-cylinders 154, 156 to cause pivotal movement of rolls and their mounts.

Considering now the outfeed or off-bearing section 14, and referring now more particularly to FIGS. 1 and 2, this comprises a frame 160 which has an upper table portion 162 mounting a series of elongated, transversely extending, smooth-surfaced rolls 164. These are constantly rotated, as by motor 163 and chain 165. The driven rolls constitute a transport conveyor for clearing paneling from the apparatus after the paneling has been cut into pieces by saw apparatus to be described.

Pivotally mounted at the forward end of table portion 162, one near each side of the table portion, is a pair of bell crank arms 166 (one of these being obscured in FIG. 2). These are suitably interbraced to enable them to be moved as a unit. Interposed between the supporting legs of frame 160 and the lower set of ends of bell crank arms 166 is an air-operated piston-cylinder 170. This is used to pivot the arms 166 and, when expanded, is operable to cause the arms to rotate in counterclockwise direction in FIG. 2 to the position indicated in dotted lines in the figure.

The arms at their upper set of ends have raised portions 172. With the arms in the position shown in solid lines in FIG. 2, portions 172 are spaced above the supporting plane of rolls 164, and constitute abutment or stop means limiting forward travel of material. When the arms are pivoted to the position shown in dotted lines, the portions 172 move down below the support plane defined by rolls 164, thus permitting material to move off the conveyer. A pair of freely rotatable rolls 174 is mounted on raised portions 172, and these move into position facilitating movement of material when arms 166 are pivoted to their lowered position.

In the above there has been shown a stop means 172 in the form of raised portions after the panel has gone through the press. The distance from that stop to the press, extending longitudinally backward as it were, is substantially the width of the press or at least one dimension of the press. That length of the panel that is completed is employed as a part of the block against which the compression means is used to press the members of the core together. A stop means cannot be used at the edge of the press where the flow is intermittent as in the machine of my invention and discovery. Therefore, I employ the portion of the panel that was in the press and has been press completed as a finished product to fill the gap in front of the stop. I employ such construction as a means against which the pressure may be applied in forcing together the multiple members of the core which are in the press and are being pressed together by the compression means. This is a difference between that and the single batch form of operation where a bar may be used at the end or at the edge of the press platen to act as a stop against which pressure may be applied to the multiple members of the core which are being edge pressed together. Thus, the completed panel extending from the press to the stop means is employed in two ways; it provides a stop means for the succeeding loading of the press and it also provides a panel positioned to be sawed into the desired widths.

Following table 162 there is a short roll conveyer section 176 including transversely extending, freely rotatable rolls 178. Rolls 178 are rotatably mounted on fixed frame structure inclining downwardly from table 162, and support panel pieces moved thereon by driven rolls 164. Below the lower end of conveyer section 176 there is a motor-driven, continuously running clearing conveyer 180 having driven conveyer chains 182. Panel pieces fall onto conveyer 180, and thence are transported to other locations in the plant. A fence 184 stops the travel of pieces falling onto conveyer 180.

In the embodiment illustrated in the drawings, two pieces are cut simultaneously from the paneling leaving the press section after each press cycle. These pieces, after cutting, are immediately free to move forward on the off-bearing conveyer onto clearing conveyer 180. A pivotable stop 186 may be provided on roll conveyer section 176 for the purpose of holding the second piece for a short time so as to permit the first piece to move out of the way on conveyer 180 before the second piece moves thereon. Stop 186 is actuated by an air-operated piston-cylinder 188. Normally the stop is in the position shown in solid lines in FIG. 2, with a panel piece free to move thereover. After one piece travels over the stop and thence strikes fence 184, a switch 190 is actuated which regulates a timer and valve (not shown) controlling piston-cylinder 188, the timer and valve causing the stop to move to a raised position for a short time interval (of long enough duration to assure that clearing conveyor 180 is free to receive a subsequent panel piece).

With reference again to the off-bearing conveyor section 14 and now referring to FIGS. 2 and 3, mounted thereabove on framework 220 is a saw or cutter mechanism indicated at 222. The saw mechanism is movable transversely of the path of material as it leaves the press section and is used to produce transverse cuts in the paneling. The saw mechanism includes a mount 226 which is slidable on the lower flanges of opposed channel members 228 which are part of framework 220. Mount 226 has a pivotally supported part 227 which carries a constantly running electric motor 230. Motor 230 rotates arbors 232 and circular saws 234 connected to the saw arbors. A projection 236 integral with part 227 is connected at its upper end to a continuous chain 240. Chain 240 in turn is trained at its ends about suitable sprockets 242 located on either side of the apparatus (one of these is not illustrated in FIG. 3). A motor (indicated in outline at 244) drives one of the sprockets 242 to produce movement of chain 240. As will be seen with reference to the solid outline in FIG. 3, when the portion of the chain connected to projection 236 constitutes a part of the upper run of the chain, part 227 and motor 230 are pivoted to a raised position and are out of the way of any paneling carried on the off-bearing conveyor. When the portion of the chain connected to projection 236 constitutes a part of the lower run of the chain, the part 227 and motor 230 are pivoted to the lower position shown in dotted outline in FIG 3. This places the saws in position to make a cut as they are moved across the paneling.

Two saws are present, and thus two cuts are made at once. Care is taken when laying up potential paneling to see to it that the edges of the slats do not lie at locations in the paneling which would move directly under the saws when the paneling is subsequently moved over the off-bearing conveyor. Thus, and referring to FIG. 4, markers 246 are provided to one side of fence 36 to indicate to an operator those portions of a potential sheet during a press cycle that on subsequent movement of the paneling would fall at the positions of the saw kerfs.

Briefly, to explain the operation of the apparatus, an operator lays up separate board slats on lay-up table portion 22, and the slats are moved by the driven rolls 26 until they lie edge-to-edge and directly in front of power-driven conveyer section 24. It will be assumed that the press of press section 12 is just about to open, and that saw mechanism 222 has completed a cutting pass to cut into two pieces the paneling deposited on the off-bearing conveyor. Before the press platens separate, piston-cylinder 170 is actuated to move the abutment means 172 above the support plane of rolls 164. When the press platens separate, piston-cylinders 154, 156 connected to jump rolls 142, 150 are actuated, to place the paper facing on the glue applier rolls. At the same time, motor 80 is started to cause actuation of conveyer section 24 and movement of belt sets 50, 52, and rotation of the applier rolls at a speed corresponding to the driven speed of the belt sets.

This produces forward movement of the paneling in the apparatus until the forward end of the paneling bears against the stops of arms 166. This stops forward movement of the paneling, and continued movement of the belts 50, 52 sets up longitudinal compression in the slats of the paneling. After a predetermined amount of compression is reached, the upper press platen of press section 12 is lowered in the start of a press cycle. When press pressures are obtained, the stops 172 at the end of the apparatus are lowered, the saw mechanism 222 is actuated to cut off sections of completed panel, the jump rolls are actuated to move the paper facing away from the applier rolls, and movement of belt sets in conveyer section is stopped. After a cut, stops 172 are raised, and the apparatus has now returned to its original condition.

Figure 6:
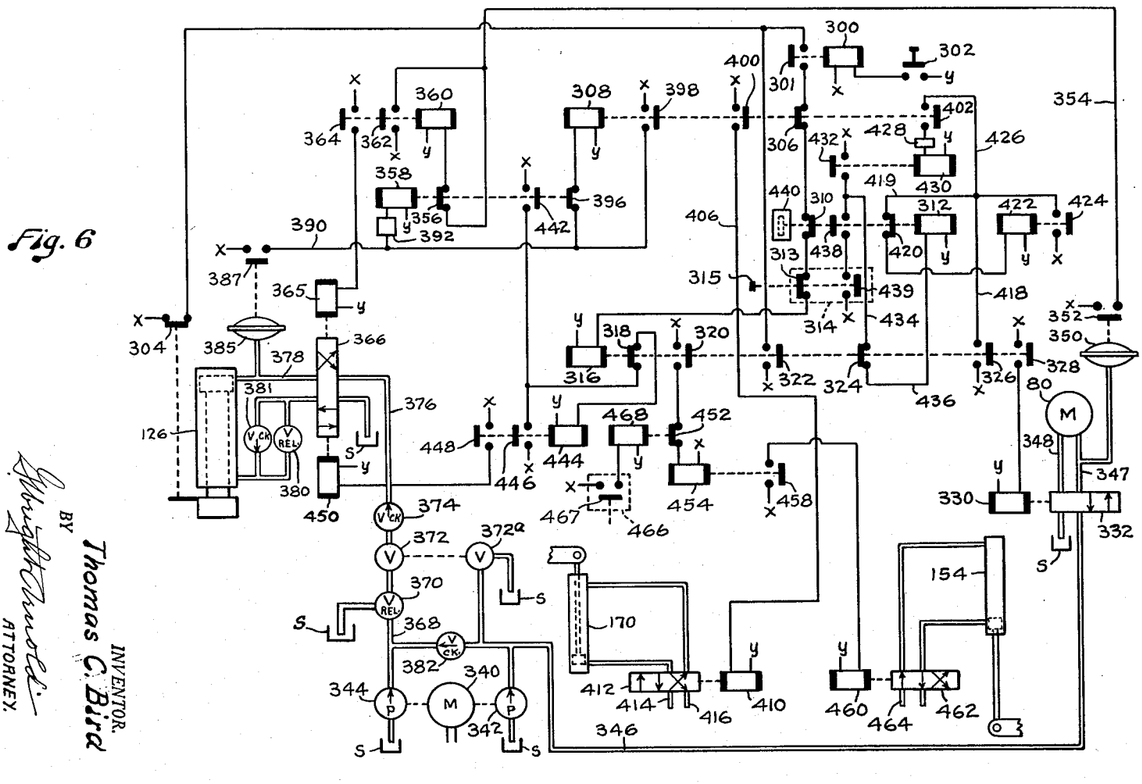
FIG. 6 is a schematic view showing an embodiment of a control system such as might be used for regulating the sequence of operation of the various mechanisms in the apparatus.

The various operations enumerated above are performed automatically and in sequence by the control system indicated diagrammatically in FIG. 6. The wiring and many of the control components are not shown in the other drawings for reasons of simplicity. In the explanation below, it will be assumed that the press platens are separated and the apparatus is ready to receive a row of slats between the press platens.

Referring to FIG. 6, 300 is a start-stop relay switch which is energized by closing a switch 302 so as to complete a circuit to the relay between a pair of source or line conductors x and y. When a switch 301 of relay 300 closes, a circuit is established from conductor x through a press limit switch 304 (which is closed with the upper press platen raised) through switch 301 of relay 300, a normally closed switch 306 of an "operational relay" 308, a normally closed switch 310 of a saw motor relay 312, a normally closed switch 313 and the solenoid of a "cycle starter" relay 316 to conductor y. Switch 313 is part of a saw limit switch mechanism 314, and is closed when the saw mechanism is to one side of the apparatus and actuating a finger 315 of switch mechanism 314 while waiting to make a cutting pass. (See FIG. 3.) With the energizing of the solenoid of cycle starter relay 316, normally closed switches 318, 324 of the relay open, and normally open switches 320, 322, 326, 328 of the relay close. Switch 322 is a holding switch maintaining the solenoid of cycle starter relay 316 energized after the upper press platen moves from its raised limit position and switch 304 opens.

On closing of switch 328 of cycle starter relay 316, a circuit is completed for a solenoid 330 between conductors x and y, this solenoid being gauged to and operating a valve 332. Valve 332 regulates the supply of pressure fluid to hydraulic motor 80 running the infeed conveyer section.

Valve 332, as well as the other valves discussed herein, are conventional, two-position valves, and have valve spools movable between two limit positions. The arrows in the outlines for the valves indicate the direction of flow through the valves as controlled by the spools of the valves for various positions of the spools. In any outline, the arrows toward the right of the outline designate the flow if the right end of the spool for the valve controls fluid flow, that is to say, these arrows designate the flow if the valve spool is shifted from right to left to place the right end of the spool in control. Conversely, the arrows at the left illustrate the flow if the left end of the spool is shifted into position by shifting the spool from left to right. With reference to valve 332 and solenoid 330, when solenoid 330 is energized it causes movement of the spool of valve 332 from right to left, and the type of flow indicated at the right of the valve outline results, that is, parallel flow takes place through the valve.

Considering the pressure fluid supply to valve 332, a motor 340 drives low and high-pressure pumps, indicated at 342 and 344, respectively. Before the spool of valve 332 is shifted by energizing of solenoid 330, flow through the valve is stopped (no arrows being indicated at the left of the outline for the valve). On shifting of the spool of valve 332 by solenoid 330, low-pressure fluid flows through a conduit 346, through valve 332, through conduit 347, and to motor 80, and the motor is actuated to produce forward movement of belt sets 50, 52. Fluid exhaust from motor 80 takes place through conduit 348 to sump S.

When the belt sets 50, 52 start their forward progress, slats are moved through the conveyer section 24 against the abutments 172 at the end of the machine, which are in their raised or "stopping" position. When the leading edge of the material strikes the abutments, the slats start to be compressed edge to edge under the urging of motor 80. This produces resistance to travel in the belt set of conveyer section 24, and as a result the fluid pressure in conduit 347 increases. The increase in pressure in conduit 347 produces expansion of a pressure-responsive diaphragm 350 and closing of a diaphragm-actuated switch 352.

On closing of normally open switch 352, a circuit is completed from conductor $x$ through the switch 352, a conductor 354, a normally closed switch 356 of a relay 358, through the solenoid of a relay 360 to conductor $y$. Relay 360 is the "press-down" control relay, and upon energizing of the relay, movement of the press platens together starts.

Specifically, when the solenoid of relay 360 is energized, a switch 362 of the relay closes which is the holding switch to maintain the relay energized irrespective of switch 352. A switch 364 also closes, which produces a connection between conductor $x$ and conductor $y$ through a valve-actuating solenoid 365. Energizing of solenoid 365 acts to pull the spool of a valve 366 controlling the press section upwardly, so that the lower portion of the spool controls fluid flow and a parallel-type fluid flow through the valve results. When such parallel flow is produced, high-pressure pump 344 pumps fluid through a conduit 368, a relief valve 370, an unloading valve 372, a check valve 374, a conduit 376, valve 366 and a conduit 378 to the upper end of the press piston-cylinders 126. This produces downward movement of the upper press platen, with fluid from the lower portions of the piston-cylinders discharging through a relief valve 380 and valve 366 to sump. With movement of the press downwardly, the press limit switch 304 opens, however, as discussed hereinabove, switch 322 of the cycle starter relay is closed by the relay to maintain the relay 316 energized after switch 304 opens.

Valve 381 is a check valve permitting fluid flow to the base of piston-cylinders 126 when the upper press platen is raised. Valve 382 is a check valve permitting flow from the low to the high-pressure pump when a certain maximum pressure is reached in conduit 346. Unloading valve 372 operates to permit the low-pressure pump to discharge to sump through valve portion 372a when high pressures are reached in the press piston-cylinders 126.

Downward movement of the upper press platen continues until material between the press platens is contacted, at which time the pressure of fluid in the press cylinders begins to rise. When the pressure reaches a certain level, a pressure-responsive diaphragm 385 is actuated, with closing of a diaphragm-actuated switch 387. On closing of switch 387, a circuit is completed between line conductor $x$, switch 387, a conductor 390, a normally closed switch 396 of a relay 358, the solenoid of operational relay 308 to conductor $y$. As a result, a switch 398 of relay 308 closes to complete a circuit from conductor $x$ through switch 398, switch 396 of relay 358, to the solenoid of relay 308, which holds the solenoid of relay 308 energized after switch 387 opens. Further, normally open switches 400 and 402 close on energizing of relay 308, and normally closed switch 306 opens. As already mentioned, switch 306 is in the circuit for the solenoid of cycle-starter relay 316, which is energized to produce forward movement of the conveyer chains feeding the press. Thus, when switch 306 opens, relay 316 is deenergized and as a result switch 328 connecting conductors $x$ and $y$ to solenoid 330 opens, to produce deenergizing of solenoid 330, return movement of the spool of valve 332 (which has a spring return) to the position shown in FIG. 5, and stopping of motor 80.

Switch 400 controls the operation of the abutments at the end of the apparatus, and switch 402 regulates the operation of the saw mechanism, and these two circuits will be described shortly.

On closing of diaphragm-actuated switch 387, conductor $x$ is connected through switch 387, and conductor 390, to a timer 392. The other side of timer 392 is connected to the solenoid of relay 358 and then to conductor $y$. Timer 392 is conventional, and has a normally open switch which is closed after a time interval of some predetermined length, for example 30 seconds, to complete a circuit through the timer. Thus the solenoid of relay 358 remains deenergized immediately on the closing of switch 387, but after a predetermined time interval becomes energized. When relay 358 is energized, the control mechanism prepared itself to repeat operation. Prior to that time, however, the saw mechanism and the abutment means at the end of the apparatus are suitably actuated so as to produce a cut in the finished paneling lying on the off-bearing side of the press and removal of panels from the off-bearing side.

Considering now the saw or cutter mechanism and stops 172, on closing of switch 400 of operational relay 308, a circuit is completed from conductor $x$ through a conductor 406, through a valve-actuating solenoid 410 to source conductor $y$. Energizing of this solenoid causes the valve spool of a valve 412 to move from left to right producing parallel flow of pressurized air through the valve and introduction of pressurized air from a supply conduit 414 to the lower end of piston-cylinder 170. The upper end of the cylinder exhausts through exhaust conduit 416. This produces enlargement of the piston-cylinder and downward movement of the upper ends of crank arms 166 (see FIG. 2) to release the paneling on the off-bearing side of the press from longitudinal compression.

As already indicated, energizing of operational relay 308 on reaching press pressures during a press cycle also has the effect of starting the saw motor 244 to produce transverse movement of the saw mechanism. It will be remembered that cycle-starter relay 316 is energized to start operation of the apparatus in the first instance. When this occurs, switch 326 of the relay closes, thus to produce a connection between line conductor $x$, a conductor 418, a conductor 419, a normally closed switch 420 of saw-motor relay 312, through the solenoid of a relay 422 to conductor $y$. This energizes relay 422 causing closing of a switch 424 of the relay, so that the relay remains energized after deenergizing of starting relay 316. This part of the circuit controlling the saw motor 244 is preconditioned by energizing of cycle-starter relay 316.

When relay 308 (the operational relay) is energized, switch 306 of the relay opens to deenergize cycle-starter relay 316, and open switch 326. Relay 422, however, continues energized by reason of switch 424 which acts as a holding switch. Energizing of operational relay 308 thus also causes a circuit to be completed between line conductor $x$, through switch 424, a conductor 426, now-closed switch 402 of operational relay 308 to timer 428. This timer, unlike the previous one described, has mechanism immediately producing a closed circuit therethrough, said mechanism after a time interval of predetermined length opening the circuit through the timer. In this instance, the time before opening is considerably less than 30 seconds, and is only sufficient to have the saw motor move from its rest position, which takes but one or two seconds. Thus, momentarily, on energizing of operational relay 308 the circuit is completed through the timer 428 to the solenoid of a relay 430 and thence to conductor $y$.

On energizing of relay 430, a switch 432 for the relay closes and a circuit is completed from line conductor $x$ through switch 432, a conductor 434, now-closed switch 324 of deenergized cycle-starter relay 316, a conductor 436, motor relay 312, and thence to line conductor $y$. This produces energizing of the motor relay, opening of its switch 310, opening of switch 420, and closing of a switch 438. On energizing of motor relay 312, the switches of a magnetic motor starter 440 for saw arbor 244 are closed to produce actuation of the saw motor. The motor then moves the saw mechanism from its rest position adjacent one side of the apparatus and a point where switch finger 315 of the mechanism is actuated. This produces opening of switch 313 and closing of a switch 439 of switch mechanism 314. With switch 439 closed, a switch 438 of relay 312 acts as a holding switch for motor relay 312 after the timer 428 opens and relay 430 becomes deenergized. The saw mechanism continues travel until a complete pass has been made, at which time finger 315 is contacted, with closing of switch 313 and opening of switch 439. This produces deenergizing of motor relay 312. By the circuit just described, the initial pulse to start the saw motor is obtained by energizing of the operational relay 308, and the saw motor operates to stop itself after a complete pass.

When timer 392 closes at the end of a predetermined time interval (which interval is the duration of the press cycle and may be about 20 to 30 seconds) a closed circuit is made between conductor x, conductor 390, timer 392, relay 358 and conductor y. This produces energizing of the relay, closing of a switch 442 of the relay and opening of switches 356, 396. This produces deenergizing of operational relay 308 to prepare it for another cycle. On closing of switch 442, a circuit is completed to a relay 444 through now-closed switch 318 of now-deenergized cycle-starter relay 316. This causes closing of a pair of switches 446, 448 of the relay, switch 446 acting as a holding switch and holding the relay energized and switch 448 closing a circuit to a valve-actuating solenoid 450. With opening of switch 356, the solenoid relay 360 deenergizes and switches 362, 364 open. Thus solenoid 450 above control valve 366, and it actuates valve 336 to pull the valve spool of the valve downwardly, thus causing crossed flow through the valve and the introduction of pressure fluid to the base of the press piston-cylinders 126. This results in raising of the upper press platen, and opening of diaphragm-actuated switch 387. The upper press platen on reaching an upper limit position closes switch 304 which formerly was open, and the entire operating cycle is ready to repeat.

It will be remembered that the jump rolls operate to move the paper facing into contact with the glue rolls only when material is passing through the press. The operation of these jump rolls is controlled by the hereinafter described circuit. When the cycle starter relay 316 is energized at the start of the operating cycle, switch 320 closes to complete a circuit from conductor x through normally closed switch 452 of a relay 468 to a relay 454. This produces energizing of relay 454 and closing of a switch 458 of the relay. As a result, a circuit is completed from line conductor x to a solenoid 460. This solenoid when energized actuates a valve 462 causing crossed air flow through the valve and pressurized air to be admitted through an inlet 464 to the base of piston-cylinders 154, 156, to cause contraction of piston-cylinders 154, 156. This moves the jump rolls so as to place the paper in engagement with the glue applier rolls. As slats and facing material moves through the press, they eventually come into contact with a switch mechanism 466 held by the crank arms at the forward end of the apparatus (see FIG. 2). When switch mechanism 466 is contacted, a switch 467 of the switch (see FIG. 6) is closed, causing energizing of relay 468 and opening of switch 452. This produces deenergizing of relay 454, opening of switch 458, deenergizing of solenoid 460, and return of the spool of valve 462 to its original position, with parallel flow of pressurized air resulting in the valve. This causes the jump rolls to move the paper facing out of engagement with the glue applier rolls.

From the above description, it will be seen that the invention has several features and advantages. The boards are assembled on lay-up table portion 22, and this may be done continuously during the operation of the interruptible press section as just described. When the upper press platen is raised, the wooden slats are pushed through the press and assembled with edge-to-edge pressure produced by means of the power-driven conveyor section 24. Operation of the press cycle is dependent upon a predetermined amount of such edge-to-edge pressure being produced. The press cycle is controlled by timer 392, and the length of the press cycle is constant. Immediately on raising of the upper press platen, material is fed into the press with a minimum time delay, all such operation being subject to various control means as herein set forth.

The apparatus is constructed substantially in three sections, the infeed, the press and the outfeed. The infeed section and the outfeed section are mounted in a frame which permits their ready horizontal withdrawal from the press section thereby permitting ready access to the press for any malfunction or for purposes of cleaning. Feed rate must coincide with the press cycle.

The apparatus is constructed to permit ready withdrawal of the infeed section in the event of a paper tear or other mishap. Such paper tear may then be corrected without long shutdown time. Considering in more detail some of the features of the machine of my invention and discovery, the following situations are to be considered.

Each board must be caused to be moved to a lateral alignment guide bar at one side of the lay-up table. The boards are of slightly different lengths and the operator is not free to carefully align the boards so that arrangement is made to have this done automatically and insure the proper alignment of the boards on one side of the lay-up table. In placing the boards on the lay-up table the operator must have a particularly wide board at the points of sawing into the finished panel, that is, at the points where the saw cuts are to be made. This will avoid leaving an unduly narrow core strip at the edge of the panel.

Figure 7:
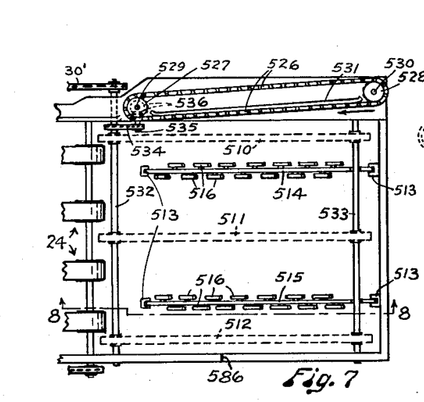
FIG. 7 is a somewhat diagrammatic plan view of an infeed section of modified form.
Figure 8:
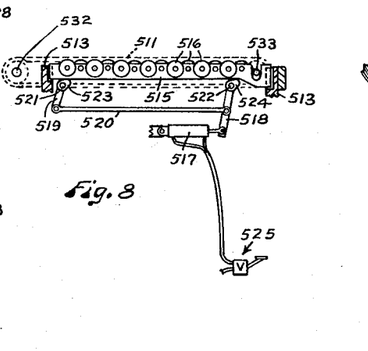
FIG. 8 is a somewhat diagrammatic view looking in the direction of broken line 8—8 of FIG. 7.

Instead of the form of feed table shown in FIG. 4, the modified form of table shown in FIGS. 7 and 8, is provided with a plurality of constantly moving feed chains 510, 511 and 512 to move the boards longitudinally of the machine toward the press section, more accurately toward the compression means 24. In order to provide the wide board at the desired points, provision must be made for removing previously laid up narrow boards already in place and moving toward the press section. This is accomplished by mounting, in guides 513, lift bars 514 and 515 extending parallel with the longitudinal axis of the lay-up table. The said lift bars 514 and 515 are provided with closely spaced small idling wheels 516. These bars 514 and 515 are adapted to be moved as a whole upwardly by air cylinder 517. The cylinder 517 is connected by levers 518 and 519 and connecting rod 520 with two transverse shafts 521 and 522. Said shafts are respectively provided with cams 523 and 524 by which the bars 514 and 515 are simultaneously lifted in parallel relationship. The upward movement of bars 514 and 515 lifts the boards above the feed chains 510, 511 and 512. The operator steps on control means 525 to operate air cylinder 517. Along one side of the infeed is provided the diagonally disposed lateral guide which consists of an endless moving guide chain or belt 526 which moves at a rate corresponding to the feed chains. The chain 526 is mounted on sprocket wheels 527 and 528 which are carried on upright shafts 529 and 530, respectively. A backing plate 531 supports the lap of said chain 526 against which the ends of the boards are pressed. Feed chains 510, 511 and 512 are mounted on shafts 532 and 533. One feed chain shaft 532 and one guide chain shaft 529 can be driven by a driving chain 30' which corresponds to the previously described driving chain 30 shown in FIG. 4. The chain 30' is directly connected with the shaft 532 and said shaft 532 is connected with the upright shaft 529 by a sprocket chain 534, shaft 535 and bevel gears 536. This synchronizes the feed chains 510, 511 and 512 and the guide chain 526. A mark 586, FIG. 7, is provided on a fixed part of the machine alongside of the feed table to indicate to the operator the position where a transverse saw cut will later be made in the finished product and thus enable the operator, if necessary, to remove narrow boards and insert a wider board at this location. This minimizes the danger of sawing close to or along a line where two boards join and thus spoiling a panel by feathering or splintering the edge of the same. The lift bars 514 and 515 make it possible for the operator to remove narrow boards and insert wider ones.

In order to insure a supply of boards ready to meet the opening of the compression section 12, boards must be delivered toward the edge compression section 24, that is, edge crowding unit, at a slightly greater rate than the unit can handle them. If the boards are not free to move into edge compressing unit 24 then the belts 50 and 52 merely slide over the boards while they are awaiting the opening of the compression members 122 and 124. The endless feed belts 50 and 52 or Caterpillar feed mechanism may be designed to provide an edge-wise pressure on the boards of 600 pounds to 1000 pounds force. This amount will vary with the character of the boards and the degree of their distortion.

A further problem involved in a device of this character is that relating to the escape of the steam provided under the press. To do this, I provide wire mesh screens 540 and 541, FIGS. 10 and 12, which are applied to the top and bottom of the panel while subjected to the press operation. As soon as the platens of the press separate, the Caterpillar belts 50 and 52 exert their pressure, forcing the panel forwardly. In instances of where the boards have a bevel or are cracked along the grain, as indicated by crack 542 in FIG. 12, with the edges of the crack in a bevel relation or where a board has a wane, that is an inclined or beveled edge, the pressure forward is of such a great magnitude that there is a tendency to force one board over the other and particularly is this true when there is a screen involved. This situation of overriding boards is aggravated when the screens are employed for the escape of the steam. Be it noted that this provision for the escape of the steam is an important factor because if this is not provided there is almost sure to develop a blister which makes the panel unacceptable. Accordingly, to minimize the overriding action due to the pressure of the Caterpillar treads, I preferably provide in the forward end, that is the outfeed end of the press, driven puller rolls 543 and 544, FIG. 10, which have a peripheral speed slightly greater than the lineal speed and rate of feed of the Caterpillar belts 50 and 52. This coordinating of the puller rolls 543 and 544 and the Caterpillar feed is done by means of sprocket chain 545 indicated by dash lines in FIG. 10. Of course, this could be done by other means.

Figures 10, 11, 12:
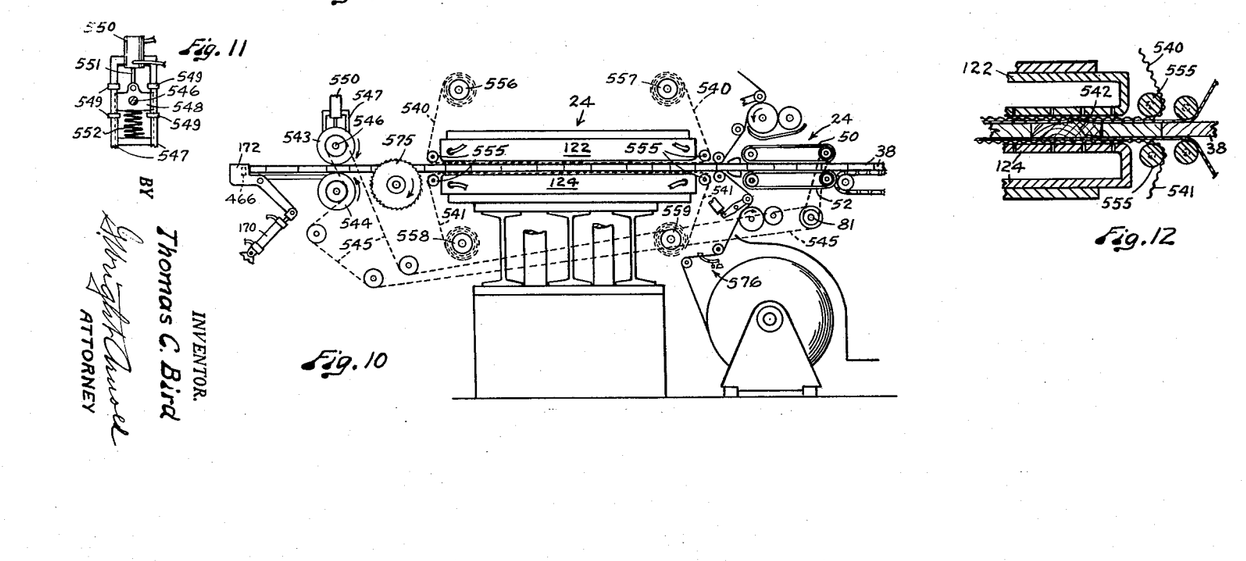
FIG. 10 is a somewhat diagrammatic side view of a machine of modified form having puller rolls and screens for the faces of the platens.
FIG. 11 is a detached view showing puller roll supporting means.
FIG. 12 is a fragmentary sectional view on a larger scale than FIG. 10 showing platens and screens used in FIG. 10.

Since the edgewise pressure on the boards is developed by the Caterpillar tread means 24 at the feed end, the opposite end of the boards are pressed against the completed panel which is moved against stop 172. In order to permit this moving against the stop 172, the puller rolls 543 and 544 are mounted to separate and permit the free movement of the completed panel therebetween as soon as the press section is occupied by the new charge of boards. This can be accomplished by movement of one of said rolls, preferably the upper roll 543, and one form of roll mounting means by which it may be accomplished is shown in FIG. 11, it being understood that this mounting means is in duplicate at each end of the upper puller roll 543 and that each such mounting supports one end of the shaft 546 of said upper puller roll. Said mounting comprises two upright parallel spaced apart guide members 547 which support a vertically movable bearing block 548 in which an end portion of the shaft 546 is journaled. Stops 549 are provided to limit vertical movement of the bearing block 548. A fluid pressure cylinder 550 is connected by a piston rod 551 with the bearing block 548 and can be caused to exert downward pressure on said bearing block to press the upper roll 543 against the panel. A compression spring 552 urges said bearing block 548 upwardly and lifts the end of the upper roll 543 journaled by said block when pressure in cylinder 548 is relieved.

If the screens are not used to avoid blistering, the moisture content in the glue and the rate of opening the press must be carefully controlled. The screen is not, from the mechanical point of operation, positively necessary. However, to meet federal housing regulations, it is necessary to have an identation, such as a screen would make, on the face of the panels. The purpose is to show up voids in the core stock.

Despite all that can be done to provide uniformity of application of adhesive to the paper, there will be occasions when, due to the flaws or tears in the paper, the adhesive will reach the screen and having been set thereon cause a great deal of difficulty and delay in the operation. To avoid this, I preferably provide, as shown in modified form in FIGS. 10 and 12, screen rolls 556 and 557 above the panel, and screen rolls 558 and 559 below the panel for the screens so that whenever a mixup of the screen and glue develops, a new section of screen may be immediately reeled into place between the platens of the press and the section of the screen that is fouled up by the glue may be exposed for prompt cleaning without delaying operation of the machine. Such screen rolls 556 and 557 above the panel and rolls 558 and 559 below the panel are mounted above and below the panel being pressed and these may be manually or power operated. The screens are guided over small rollers 555 near the edges of the platens 122 and 124.

Figure 9:
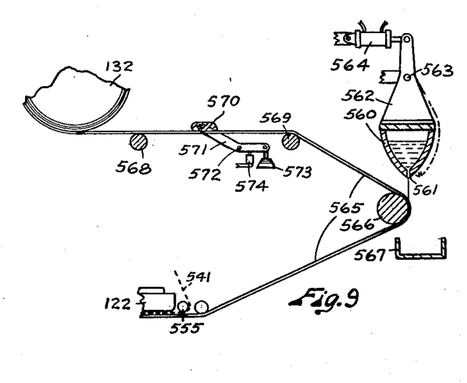
FIG. 9 is a diagrammatic view of glue applicator means of modified form.

In the modified form of the glue applicator shown in FIG. 9, a V-shaped trough 560 is provided to hold glue under pressure and this trough has a slot 561 at the apex and is mounted in a frame 567 pivotally mounted at 563. This frame is provided with an air cylinder 564 whereby the trough may be moved in a small arc to cause the falling glue to contact and separate from contacting the flexible paper 565 enroute to the press and where it passes around a roll 566. A trough 567 catches glue which drips from the paper and glue emitted from slot 561 when the lower end of trough 561 is moved to the right so that the discharging glue misses the paper.

If the paper stops moving it is desirable to swingingly move the trough 560 so the glue discharging from slot 561 will be clear of the paper and will be caught by the trough 567. I do this by providing electric switch means which is responsive to variations in the tension of the paper. To this end I pass the paper over two small rollers 568 and 569 and place a weight 570 on the stretch of paper between these rollers 568 and 569. The weight 570 can be in the form of a small roller. Said weight extends at least partially across the paper and is supported from the upper end by at least one lever arm 571. The lever arm 571 is pivoted on a fulcrum member 572 and has an adjustable counterweight 573 suspended from its lower end. A switch 574 is positioned for operation by the part of the lever arm 571 between the fulcrum 572 and the counterweight 573. If the paper stops moving and becomes slack the weight 570 will move downwardly and the switch 574 will be operated to control the supply of fluid pressure to cylinder and move the lower end portion of trough 560 to the right from the position shown in FIG. 9.

In some instances it may be desirable to trim the ends of the panels. For this purpose a trimmer saw 575 is provided, FIG. 10, and its operation is coordinated with the movement of the panels.

Switch mechanism 576, FIG. 10, which is similar to switch mechanism 572, 574 of FIG. 9, can be used to control cylinder 550 of FIG. 11, so that, when the press closes and the feed of the paper stops, the slackness of the paper will function to operate cylinder 550 and lift the upper puller roll 543 to stop the pulling operation.

While there has been described an embodiment of the invention, it is appreciated that changes may be made in the parts and their organization without departing from the inventive concept thereof. It is desired not to be limited to the particular embodiment illustrated, but to cover all modifications and arrangements which would be apparent to one skilled in the art and that come within the scope of the appended claims.

I claim:

1. Apparatus for manufacturing paneling from facing material and a core composed of a plurality of slats arranged edge to edge in abutting relation with respect to each other and free from a common securing medium between abutting edges comprising driven conveyer means defining a path for such slats for transporting positively an elongated row of such slats laid side by side forwardly along a path with the slats moving transversely of their length, intermittently operated press means comprising a pair of expansive and opposed pressure platens at the forward end of the path defined by said conveyer means and disposed above and below said path and operable upon actuation to compress for a time interval the slats normally of the plane defined by the row of slats, said platens in a release position accommodating the uninhibited passage of such row of slats therebetween and guiding the forward progress of the slats, means for feeding facing sheets against opposite faces of said row of slats immediately prior to its entry between said press platens, said facing sheets having deposited over their inner surfaces films of adhesive, transport means on the side of the platens away from said conveyer means for carrying material away from the platens and defining a path which is a continuation of the path defined by said conveyer means, and releasable means located in the path defined by said transport means positively for stopping forward movement of said row of slats and holding said row thus to enable when the platens are in their release position longitudinal compression to be produced in the row under the forward urging of said driven conveyer means, said apparatus serving to coat said core while yet maintaining the edges of adjacent slats of said core free from adhesive.

2. Apparatus for manufacturing paneling from a pair of opposed facing sheets and a core composed of a plurality of slats arranged edge to edge in abutting relation with respect to each other and free from a common securing medium between abutting edges, comprising driven conveyor means for transporting positively an elongated row of such slats forwardly along a path with the slats laid side by side and moving in a direction extending transversely of their length, intermittently operated press means comprising a pair of expansive and opposed pressure platens at the forward end of the path defined by said conveyer means and with one platen disposed above and with the other platen disposed below the plane of said path, said platens in their release position accommodating the uninhibited passage of the row of slats therebetween, said press means being operable upon actuation to compress the slats normally of the plane defined by the row of slats, guide means for guiding one of said facing sheets against the bottom surface and the other of said facing sheets against the top surface of said row of slats immediately prior to their entry between the press platens, a rotatable glue applier roll for each of said facing sheets operable by engagement with the sheet to apply adhesive to the inner surface of the facing sheet, means for revolving the glue applier rolls at approximately the speed of the sheet moving thereover, transport means on the side of the platens away from said conveyer means for carrying material away from platens and defining a path which is a continuation of the path defined by said conveyer means, releasable means located in the path defined by said transport means for stopping forward movement of said slats and holding said slats thus to enable when the platens are in their release position longitudinal compression to be produced in the slats under the forward urging of said conveyer means, control means for actuating the press means to start a press cycle triggered by the production of longitudinal compression in said slats, and means for moving the facing sheets out of engagement with said applier rolls during a press cycle, said apparatus serving to coat said core while yet maintaining the edges of adjacent slats of said core free from adhesive.

3. Apparatus for manufacturing a consolidated sheet product from facing material and disjointed slats arranged edge to edge in abutting relation with respect to each other and free from a common securing medium between abutting edges, said apparatus comprising a lay-up table portion having top exposed and means operable continuously to urge slats deposited thereon forwardly along the table portion, a driven conveyer section disposed forwardly of said lay-up table portion having opposed conveyer belts defining a path of travel for the slats and gripping top and bottom surfaces of slats fed thereto and being fed continuously by said lay-up table portion, a pair of opposed press platens forwardly of said conveyer section disposed one above and one below the path defined by said conveyer section and means for bringing the platens together during a press cycle, said press platens in a release position accommodating the unhindered passage of slats therebetween, guide means directing sheets of facing material against top and bottom surfaces of slats advancing between said press platens with said facing material contacting slats at a location intermediate said platens and said conveyer section, applier means for applying adhesive to said sheets of facing material and means regulating the applier means whereby the applier means is made inoperative during a press cycle, and releasable stop means on the side of the platens away from said conveyer section for stopping when in operative position forward movement of slats between the press platens when the latter are in a release position and by the reaction force produced against the forward thrust of said conveyer section producing lateral compression of a row of slats which extends from said stop means rearwardly in the apparatus to said conveyer section, said apparatus serving to coat said core while yet maintaining the edges of adjacent slats of said core free from adhesive.

4. The apparatus of claim 3 which further comprises cutter means on the side of the press platens away from said conveyer section for cutting off selected widths of consolidated sheet moving out from between the press platens, and which further comprises control means for releasing said releasable stop means from operative position, actuating said cutter means, and reinstating said releasable stop means in operative position in that sequence and automatically during each press cycle.

5. The apparatus of claim 3 wherein the lay-up table portion and conveyer section are mounted on frame structure disconnectable from frame structure supporting the press platens and guide means for the sheets of facing material, thus to enable separation of the lay-up table portion and conveyer section from said press platens and guide means.

6. Apparatus for making paneling from facing material and a series of slats arranged edge to edge in abutting relation with respect to each other and free from a common securing medium between abutting edges comprising an intermittently operating press having a pair of opposed press platens set one above the other, a driven conveyer section on one side of said press platens for transporting a row of such slats with the slats arranged transversely of the row between said platens, said row moving in a longitudinal direction between said platens and being guided by said platens when said platens are in a release position, guide means between said platens and said conveyer section for directing sheets of facing material against top and bottom surfaces of such a row of slats, a constantly rotating glue applier roll means associated with each of said sheets of facing material operable when in operative position relative to the sheet to deposit adhesive on the inner surface of the sheet, power means for placing each applier roll means in operative position relative to its associated sheet, stop means on side of the press opposite said conveyer section for stopping movement of slats through the press under the urging of said conveyer section when said platens are in a release position, said stop means acting with said conveyer section to produce longitudinal compression of such row of slats, and control means for said power means and press means for placing automatically the applier roll means out of operative position and for starting automatically a press cycle of predetermined length after such longitudinal compression is produced, said apparatus serving to coat said core while yet maintaining the edges of adjacent slats of said core free from adhesive.

7. Apparatus for producing a composite sheet product from sheets of facing material and disjointed wood slats arranged edge to edge in abutting relation with respect to each other and free from a common securing medium between abutting edges and comprising an intermittently operating press having a pair of expansive and opposed pressure platens set one above the other and spaced apart in a release position and means for bringing the pressure platens together during a press cycle, a power-driven conveyer section on the infeed side of the press platens for pushing positively an elongated row of wood slats in a path through the space between the platens when the platens are in a release position, means for feeding facing material against opposite faces of such a row of slats prior to entry between the press platens, transport means on the off-bearing side of the platens and opposite to said conveyer section and aligned with the path of such a row of wood slats for carrying off slats moving from out between the platens, releasable abutment means located in the path defined by said transport means for stopping when in operative position forward progress of such a row of slats when the platens are in a release position and for producing when the slats are backed up between the press platens and into the conveyer section longitudinal compression in the row of slats, cutter mechanism located on the off-bearing side of said platens movable transversely of the path of such a row of slats and operable when actuated to cut off selected lengths of material, and control means for actuating the cutter mechanism, releasable abutment means and said press in timed relation, said control means having means responsive to the build-up of longitudinal compression in a row of slats for actuating said press to start a press cycle of predetermined time duration and means for placing said abutment means in inoperative position and actuating said cutter mechanism to produce cuts after the start and during the expiration of said press cycle, said apparatus serving to coat said core while yet maintaining the edges of adjacent slats of said core free from adhesive.

8. Apparatus for manufacturing paneling from facing material and disjointed wood slats arranged edge to edge in abutting relation with respect to each other and free from a common securing medium between abutting edges, said apparatus comprising a driven conveyer section having opposed conveyer belts defining a path for transporting an elongated row of such wood slats, said wood slats being arranged transversely of the row and side by side, intermittently operated press means comprising an upper and a lower press platen at the forward end of the path defined by said conveyer section with one platen above and one platen below said path, said press means being operable on a press cycle to compress such row of wood slats normally of their faces, guide means for directing sheets of facing material against opposite faces of the wood slats with the sheets of material moving into engagement with the slats at locations disposed between the press platens and said driven conveyer section, power-driven adhesive applier rolls for applying adhesive to the sheets of facing material, roll means for moving the sheets of facing material relative to the applier rolls thus to control the application of adhesive to the facing material, transport means on the side of the press means away from said driven conveyer section for carrying material away from the press means, said transport means defining a path which is a continuation of the path defined by said driven conveyer section, releasable abutment means located in the path defined by said transport means for stopping forward movement of said slats and holding the row thus to enable longitudinal compression of the row to be produced by the forward thrust of said driven conveyer section, cutter means movable in a path extending transversely of the row of slats located over said transport means for cutting material moved from the press means into selected lengths, and control means for actuating automatically said roll means to produce the application of adhesive between press cycles and for automatically releasing said abutment means and moving the cutter so as to make a cut during a press cycle, said apparatus serving to coat said core while yet maintaining the edges of adjacent slats of said core free from adhesive.

9. Apparatus for manufacturing consolidated board products from elongated sheets of facing material and plural disjointed wood slats arranged edge to edge in abutting relation with respect to each other and free from a common securing medium between abutting edges comprising a frame, an intermittently operated press section having upper and lower press platens mounted on the frame and movable together during a press cycle thus to produce press pressure, a power-driven conveyer section to one side of the press section for moving a row of such slats along a path into the space between said press platens when the press platens are separated between press cycles, means automatically for stopping the power-driven conveyer section at those times that press pressure exists in said press section and for running the conveyer section between press cycles, guide means for directing sheets of facing material against opposite faces of such row of slats prior to their entry into the press section, applier rolls for said sheets of facing material for applying adhesive thereto, means continuously rotating said applier rolls, means for placing said paper facing into and out of contact with said applier rolls, and means automatically for rotating said applier rolls at substantially the speed of said power-driven conveyer section when the latter is running between press cycles, said apparatus serving to coat said core while yet maintaining the edges of adjacent slats of said core free from adhesive.

References Cited in the file of this patent

UNITED STATES PATENTS

| | | |
|---|---|---|
| 1,702,185 | Weber | Feb. 12, 1929 |
| 2,254,394 | Ratley | Sept. 2, 1941 |
| 2,314,453 | Mack | Mar. 23, 1943 |
| 2,589,966 | Rullo | Mar. 18, 1952 |